(12) United States Patent
Gruber

(10) Patent No.: US 6,739,502 B2
(45) Date of Patent: *May 25, 2004

(54) PROPERTY MANAGEMENT SYSTEM

(75) Inventor: Robert Michael Gruber, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/267,095

(22) Filed: Oct. 7, 2002

(65) Prior Publication Data

US 2003/0116619 A1 Jun. 26, 2003

Related U.S. Application Data

(63) Continuation-in-part of application No. 09/597,379, filed on Jun. 19, 2000, now Pat. No. 6,464,133.

(51) Int. Cl.$^7$ .............................................. G06F 17/00
(52) U.S. Cl. ........................................ 235/375; 235/383
(58) Field of Search ................................ 235/383, 385, 235/375; 705/8, 22, 28, 29

(56) References Cited

U.S. PATENT DOCUMENTS

| | | | | |
|---|---|---|---|---|
| 5,319,544 A | * | 6/1994 | Schmerer et al. | 364/403 |
| 5,380,994 A | * | 1/1995 | Ray | 235/472.01 |
| 5,404,442 A | * | 4/1995 | Foster et al. | 359/159 |
| 5,883,370 A | * | 3/1999 | Walker et al. | 235/375 |
| 6,464,133 B1 | * | 10/2002 | Gruber | 235/375 |

* cited by examiner

Primary Examiner—Daniel St. Cyr
(74) Attorney, Agent, or Firm—David S. Kalmbaugh

(57) ABSTRACT

A computer program for managing property using a program designed to assist a user in completing the required forms to manage the property. The program assists the user by providing hints, overlaying text, and trouble shooting suggestions. The user is guided through each segment of a form to minimize the possibility of human error. The program converts human readable text to a barcode. The completed form is downloaded and printed from a printer.

23 Claims, 7 Drawing Sheets

INSTRUCTIONS FOR USING THE PROGRAM

This program creates 2 identical copies of the DD 1348-1a form on a single sheet of paper (in portrait orientation). A dashed line separating the 2 is a suggested cut line.

When you mouse click (or Tab—in fact, it's best to use the Tab key) into a field with 'red' text, what you type replaces that text. In no case does the 'red' text print.

Use Record 1 as a Disposal template – only enter data that you will want in all disposal records, e.g. Block 2 and your identifying information in the lower right of the form. Whenever you want a real record, click the cyan 'New Record for Disposal' button, on the left, near the top.

Disposal Template Initialization

On the far left, near the top, is a Rolodex(or flipbook). Drag the bookmark sticking out its right side to the top. That places tou in Record 1 as will be indicated by the '1' at the bottom right of the Rolodex. You may now enter the generic info for all disposal records.

Click the pale yellow button below and enter the appropriate Unit Identification Code (UIC) to have the program automatically enter your UIC in Blocks 2 & 24 on all new records.

[ Enter UIC & CWC (& CWC position) for new Records ]—20

Current UIC & CWC (& CWC position)
    N63126 & ?? (After Serial #)

Record 2 should be reserved as a Receiving template. Click the lavender 'New Record for Receiving' button (next to the Disposal button) to use the Receiving template. Click the green 'Receiving Equipment' button below for instructions.

[ Receiving Equipment ]—54

(Move from Record 1 to Record 2 by clicking the lower page of the Rolodex.)

The program automatically enters the JDAY in Blocks 5 & 24 based on the date in your computer. Please ensure the date in your computer is correct.

Use the large mountain in the lower left (in the status area) to zoom in for data entry.

[ Hints for Filling Out the Form ]—46

[ TroubleShooting ]—56

Report errors/submit change requests to:
    XXXXX XXXXXXX
    XXXXXXXX Code XXXXXXXXX
    (123)456-7890

*FIG. 2*

| 1 | 2 | 3 | 4 | 5 | 6 | 7 | 2 2 3 | 2 4 | 2 5 | 2 6 | 2 7 | 2 8 | 2 9 | 4 4 5 6 | 4 7 | 4 8 | 4 9 | 5 0 | 5 1 | 5 2 | 5 3 | 5 4 | 5 5 | 5 6 | 5 7 | 5 8 | 5 9 | 6 0 | 6 1 | 6 2 | 6 3 | 6 4 | 6 5 | 6 6 | 6 7 | 6 8 |
|---|---|---|---|---|---|---|---|---|---|---|---|---|---|---|---|---|---|---|---|---|---|---|---|---|---|---|---|---|---|---|---|---|---|---|---|---|
| D O C U M E N T | | | | | RI FROM | M & S | UNITS | QUANTITY | | | | | | SER | SUPPLE-MENTARY ADDRESS | | | | SIGN | FUND | DIS-TRI-BU-TION | | | PRO-JECT | | | PRI | RE-QD DEL | | | ADV | | | | RI |

24. DOCUMENT NUMBER & SUFFIX (30-44)

25. NATIONAL STOCK NUMBER & ADD (8-22)

26. RIC (4-6)
UI (23-24)
QTY (25-29)
CON CODE (71)
DIST (55-56)
UP (74-80)

27. ADDITIONAL DATA

DD FORM 1348-1A, JUL 91 (EG) ISSUE RELEASE/RECEIPT DOCUMENT

*FIG. 6A*

FIG. 6B (Rotated table, labels include:)

| 1.TOTAL PRICE | 2.SHIP FROM | 3.SHIP TO |
| UNIT PRICE | DOLLARS | CTS |
| DOLLARS | CTS | 4.MARK FOR |
| 5.DOC DATE | 6.NMFC | 7.FRT RATE | 8.TYPE CARGO | 9.P3 |
| 10.QTY REC'D | 11.UP | 12.UNIT WEIGHT | 13.UNIT CUBE | 14.UFC | 15.SL |
| 16.FREIGHT CLASSIFICATION NOMENCLATURE |
| 17.ITEM NOMENCLATURE |
| 18.TY CONT | 19.NO CONT | 20.TOTAL WEIGHT | 21.TOTAL CUBE |
| 22.RECEIVED BY | 23.DATE RECEIVED |

Column header strip: 67 68 69 70 71 72 73 74 75 76 77 78 79 80
RI / OCP, MON, OGT, NTD

10

PROPERTY MANAGEMENT SYSTEM

This application is a continuation-in-part of U.S. Pat. application Ser. No. 09/597,379, filed Jun. 19, 2000 now U.S. Pat. No. 6,464,133.

BACKGROUND OF THE INVENTION

1. Field of the Invention

The present invention relates to a property management system. More particularly, the present invention relates to a property management system, which assists personnel in completing a form that is required for the disposal of property and for receiving property previously disposed of by another entity.

2. Description of the Prior Art

In modern business practices, maintaining an accurate inventory of equipment and merchandise is crucial. In the past, taking an inventory was an entirely manual process, and therefore often slow and expensive. Modern automated inventory systems have improved the accuracy and speed of this process while reducing its cost. As businesses grow, the need to accurately detail the transfer of various property becomes more vital as businesses seek to efficiently manage all assets.

Bar coding used for the identification of employees, tools, parts, merchandise, etc. is now a well-known and a proven technology. Use of bar code scanning for data entry is rapidly replacing the keyboard, the once dominant technology in many applications.

This swift change is the result of several factors. With bar code scanning, overall data entry performance improves because the equipment is easy to use. Less labor is involved, since typing is not required. Because there is no typing, spelling errors and other "typos" are essentially eliminated. Accuracies of over 99% are the norm today. Language barriers are non-existent, in fact, reading ability may not even be a factor as audible signals replace text as the means to indicate successful/unsuccessful completion of data entry.

While the use of bar codes in the United States dates from the 1950's, only recently has bar code technology been combined with another well-known and proven technology, the database. By combining these technologies, powerful features can exist for collecting data and utilizing the database for processing the data.

Numerous innovations for inventory management systems have been provided in the prior art that are described as follows. Even though these innovations may be suitable for the specific individual purposes to which they are addressed, they differ from the present invention as hereinafter contrasted.

In U.S. Pat. No. 4,972,318 issued to Brown et al. on Nov. 20, 1990, a method of order entry, product selection and inventory control for building products, building accessories and building product components is described. In U.S. Pat. No. 5,319,544 issued to Schmerer et al. on Jun. 7, 1994, a system and method for monitoring and verifying inventory is provided which comprises a portable computer with a printer and a modem "cabled" together and maintained in a carrying case. In U.S. Pat. No. 5,380,994 issued to Ray on Jan. 10, 1995, a portable microcomputer inventory system is disclosed which includes a plurality of components and a support for supporting the components on a user as the user inventories items that have a bar code thereon. In U.S. Pat. No. 5,404,442 issued to Foster et al. on Apr. 4, 1995, a text, graphic or other selected objects of a computer screen are selected and converted into a "visual clipboard" which is attached to a convenient boundary of the screen.

The above described patented invention differ from the present invention because the patented inventions lack one or more of the following features: explanatory text and help features, a unique document number created from various codes, a program compatible with all types of printers, a program capable of duplicating an entire form and computer software having a computer software inventory therein.

Numerous innovations for inventory management systems have been provided in the prior art that are adapted to be used. Even though these innovations may be suitable for the specific individual purposes to which they are addressed, they would not be suitable for the purposes of the present invention as heretofore described.

SUMMARY OF THE INVENTION

One object of a preferred embodiment of the present invention is to provide a system and method for assisting a user in completing a property management form.

More particularly, another object of a preferred embodiment of the present invention is to provide a system and method that records information on an equipment disposal form for managing property.

Yet another object of the present invention is to provide a property management system which allows the user to receive previously disposed of equipment and other property from another facility.

Further, another object of the present invention is to provide a computer software program which is compatible with any personal computer having the Microsoft Windows operating system eliminating the need for specialized software in order to use the program.

Also, the property management system incorporates a program, which can convert human readable text to a barcode. The property management system of the present invention is described as it pertains to form DD 1348-1A, which is a Government form used to dispose, receive and track property.

In carrying out the above objects of the present invention, a property management system is provided for setting up various help features to assist the user in completing a form. These help features include colored overlaying text, hints and troubleshooting. The overlaying text allows a user to view the assistance features in fields of a computer screen layout, but the overlaying text will not appear on a final printed copy. The overlaying text is a different color from the text of the form, so the user may distinguish between the two. The hints assist the user in entering codes, numbers and other information relevant to property disposal. The troubleshooting feature lists frequently encountered problems and suggests possible solutions.

Advantages of the preferred embodiments of the property management system comprising the present invention include:

(1) Automatic duplication of a form.
(2) Converting human readable text to a barcode.
(3) Providing various codes and acronyms for user assistance.
(4) Anticipating problems and providing the user with possible solutions.
(5) Creating a user-friendly system, which permits easy completion of a form.
(6) Automatic Insertion of commonly used information into various sections of a form after a one-time initializing entry of the information.

(7) Providing access to various codes and code definitions.

(8) Enabling the user to print a form to virtually any type of printer.

(9) Providing a means for receiving property previously disposed of by another activity.

(10) Providing a computer software program which is windows compatible.

BRIEF DESCRIPTION OF THE DRAWINGS

FIGS. 1–5 illustrate a variety of pictorial representations of form DD 1348-1A which appear on the computer screen of a user; and FIGS. 6A and 6B are detailed illustrations of the columns and blocks with written titles which identify the information being supplied by the user of the form DD 1348-1A.

DETAILED DESCRIPTION OF THE INVENTION

Figure 1:
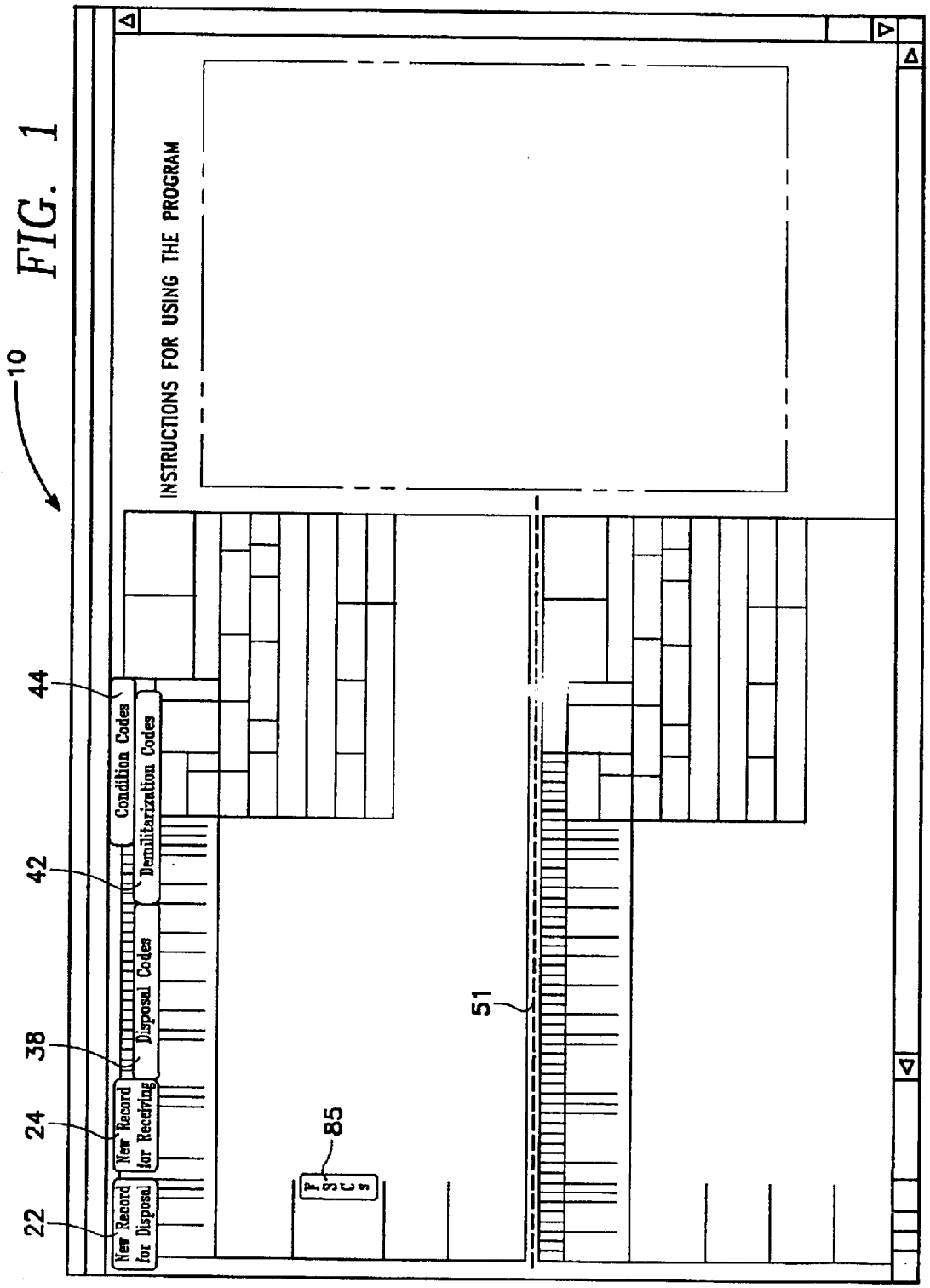
Figure 3:
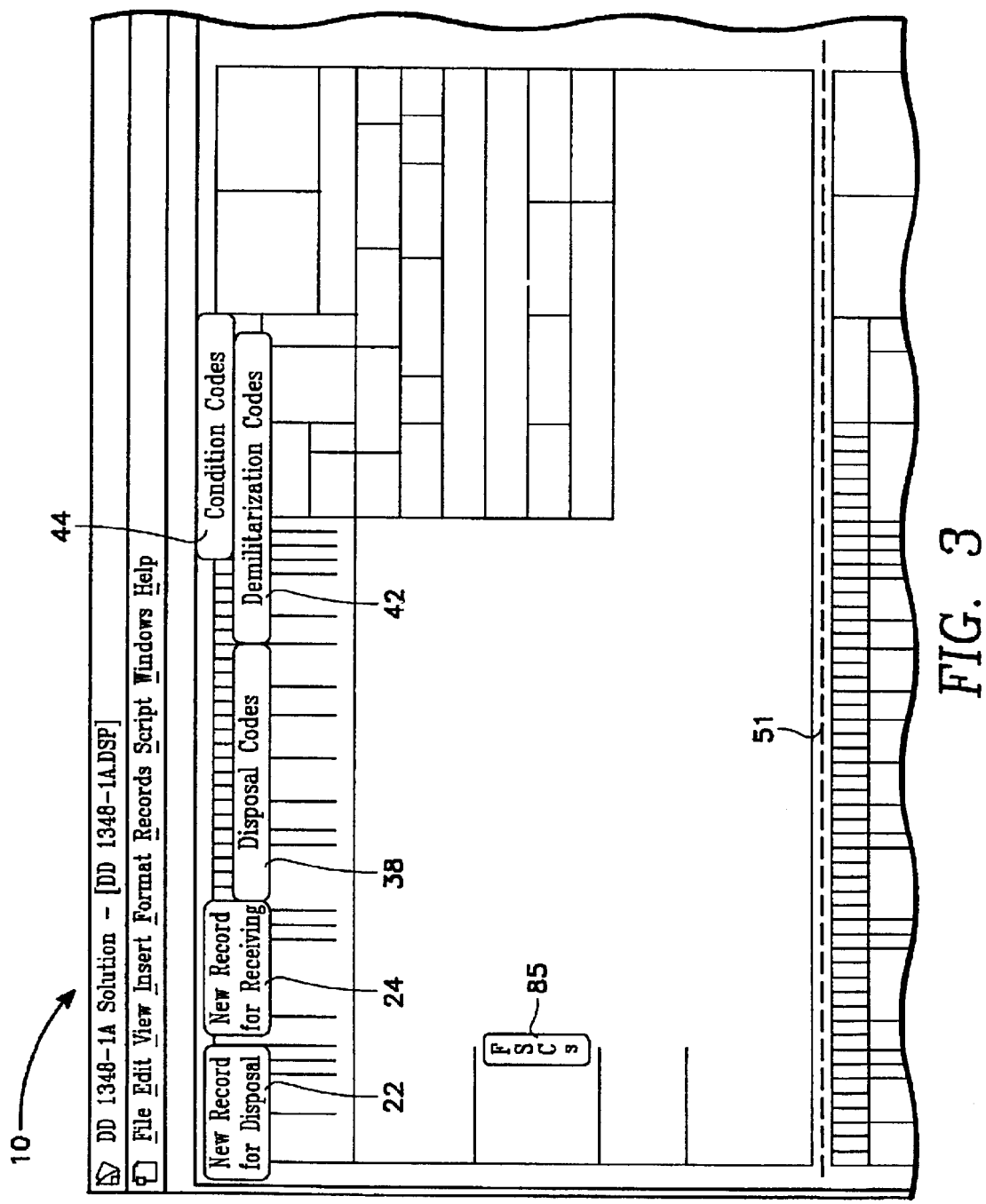
Figure 4:
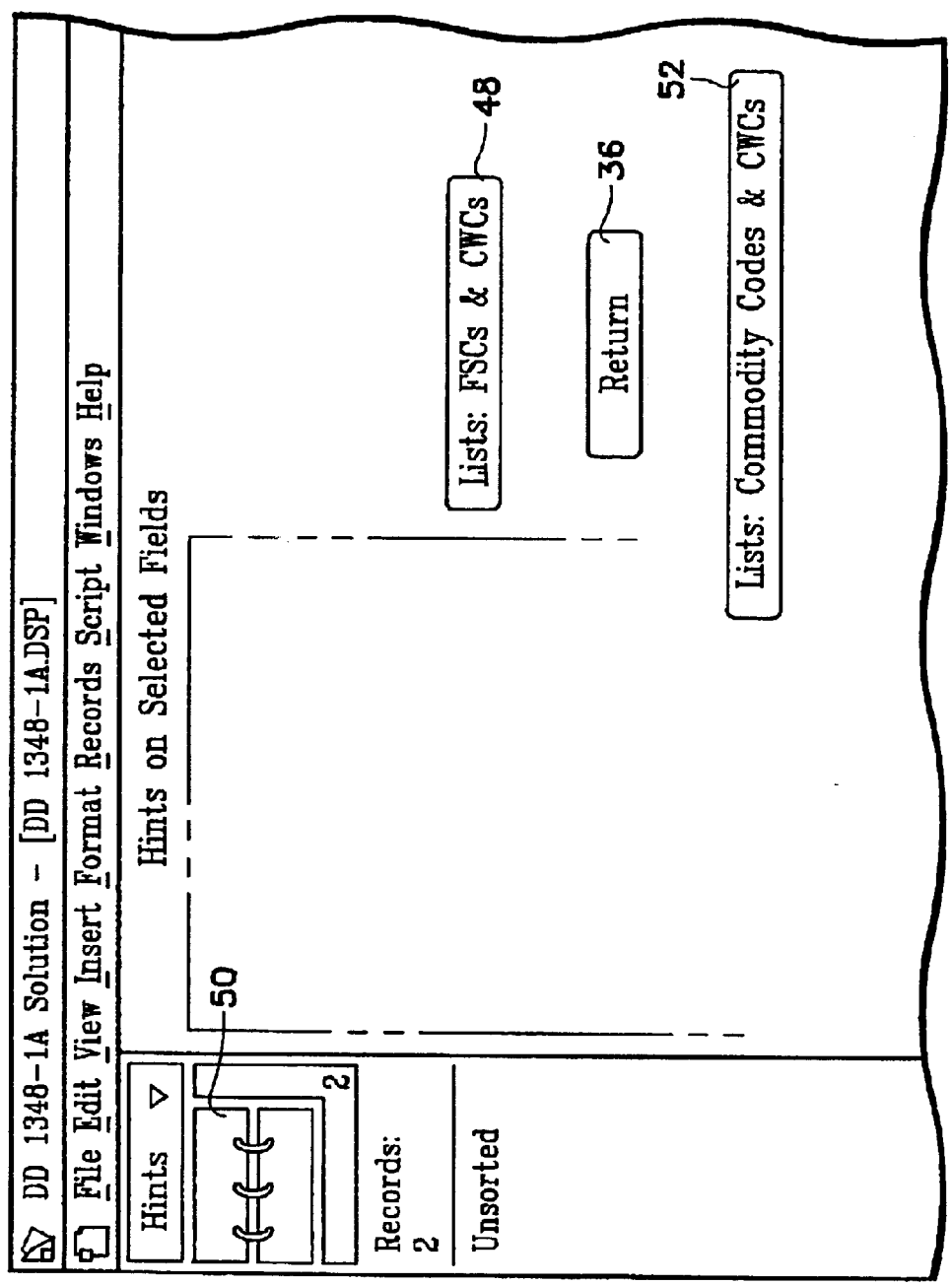
Figure 5:
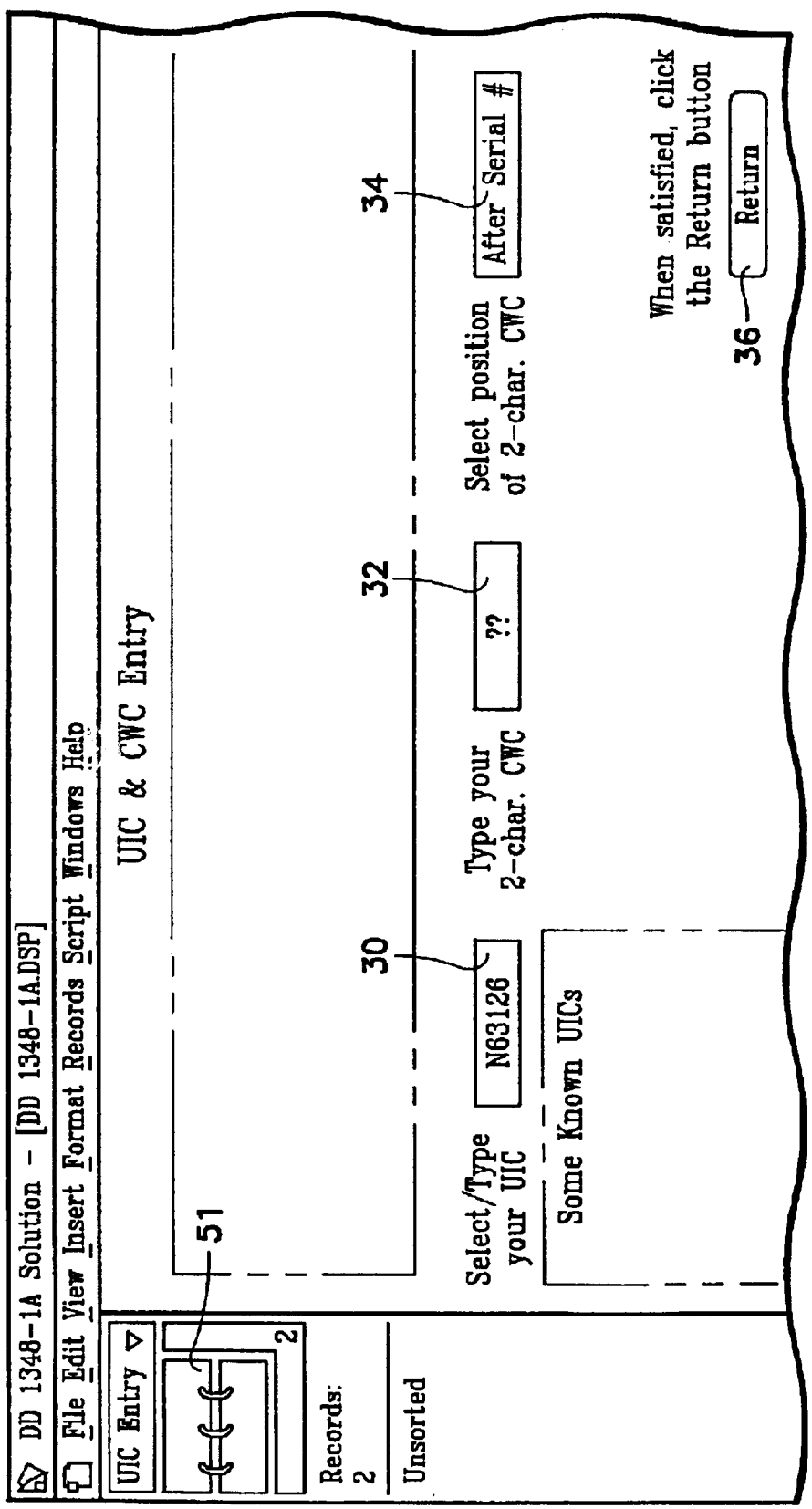

Referring first to FIGS. 1–5, 6A and 6B, there is shown a form DD 1348-1A Issue Release/Receipt Document 10. The DD 1348-1A form 10 is a required form used in connection with the disposal of equipment. The DD 1348-1A form 10 is also used for receiving property previously disposed of by another activity. The computer software, which is used to generate form 10, is compatible with all versions of the Microsoft Windows operating system.

The form 10 contains information relating to the equipment to assist office managers, other employees, and a central office in tracking equipment. A preferred embodiment of the present invention provides a system and method for assisting a user in completing the DD 1348-1A form 10. The preferred embodiment of the present invention does not require the use of FILEMAKER PRO(r) to operate.

The primary layout/screen is an image of the DD 1348-1A form 10. Questions marks or explanatory text are overlaid in each field that requires an entry. These items remind the user where to make entries. The program calculates the total price by multiplying the Quantity by the Unit Price. Several other layouts/screens provide context-sensitive help by listing and explaining the possible entries for the given field.

Another layout/screen allows entry of a Unit Identification Code (UIC) and a Compressed Work Center (CWC)—if any—that are incorporated in the Document Number and that repeat on each form/document. The UIC is a six-digit Federal Government code which identifies the activity and the CWC is a two-digit locally generated code in which the activity defines its components, i.e. accounting, test and evaluation, engineering design, human resources, etc. There is a separate two-digit code which identifies a serial number for the property being disposed by the user. It should be understood that the serial number is a sequence number for a particular Julian date.

If the user's organization doesn't use a CWC or an equivalent thereof, the user enters two question marks which reminds the user to enter the last 2-digits of the 4-digit serial number. Alternatively, the user may elect to use all four digits as a serial number. If the first two digits will remain the same (e.g. 00), the user may enter these digits (e.g. 00) as the CWC, and then the last digits are sequential.

The user also has the option of placing the two-digit CWC before or after the two-digit serial number for the property being disposed of by the user.

The UIC and CWC data are automatically entered on each new document. Should the information change, clicking the Enter UIC and CWC button 20 returns the user to that layout/screen to update the entered data. The updated user-specific information will be used on newly created documents, but will not alter the existing records/documents. The UIC and CWC button 20 is a yellow coded button on the DD-1348-1A form.

The computer program used for the DD-1348-1A creates a pair of identical copies of the DD 1348-1A form on a single sheet of paper in a portrait orientation format as shown in FIGS. 1–5 and 6A and 6B. A dashed line which separates the two forms is the suggested cut line 51.

The user clicks on the New Record for Disposal button 22 to create an actual record for disposal of equipment. The New Record for Disposal button 22 is a light blue colored button. The record, identified as record one (1), serves as a template for future records. After the user provides a one-time entry of user-specific information such as name and address in record 1, the user clicks the "New Record for Disposal" button 22 to create a copy of the template record. The data in record 1 become defaults for future records. The program automatically builds some fields, either completely or partially: for Block 5 it uses the date in the computer to create the Julian date; for Block 24 two (2) of three (3) elements of the Document Number—the Unit Identification Code (UIC) and Julian date—are entered automatically. If there is a CWC or equivalent, two digits for the four digit serial number are entered automatically. The Tab key may then be used to aid orderly data entry in the new record.

The program incorporates the 3 of 9 barcode font for blocks 24 and 25 of the form 10. The user enters human-readable text and the program creates the barcode. Block 24 of the form 10, the Document Number, is always barcoded. For Block 25, the program distinguishes between Local Stock Numbers (LSNs) and National Stock Numbers (NSNs), with only NSNs being barcoded. To aid the user in constructing the LSN, the program provides a list of common Federal Supply Classes (FSCs), a 4-digit code, and the equipment each code encompasses.

The program of the present invention is able to print to any printer, such as laser jet, inkjet, bubblejet, or dot matrix, so long as, the printer is supported by WINDOWS NT(r), or WINDOWS 9X(r), Windows 2000(r) or Mac OS.

The step by step operating instructions are as follows:
Initialization Usage

1. Double click a 1348-1A shortcut on the desktop screen for the personal computer being used to run the program.
2. Click the yellow Enter UIC and CWC button 20
3. Click the left yellow button 30 and select or type the UIC for the user's facility or installation.
4. The middle yellow button 32 allows the user to enter his CWC or "00" if the user does not have a CWC or its equivalent.
5. With the right yellow button 34, the user selects "After Serial #" if the user has a CWC; if there is no CWC, the user selects "Before Serial #".
6. The user then clicks the Return button 36 when the user is satisfied with the entries.
7. In the upper left corner of Form 10 is a Rolodex or Flip Book 50. The user clicks the top page of Flip Book 50 to go to Record 1. Record 1 is the disposal template record.
8. At the bottom right of the form 10 the user enters the user's name, address, phone number, and an underline for POC (point of contact) signature.
9. The user copies the name and address entered in step 8 and pastes this information in Block 2 of form 10.
10 The user clicks the lower page of the flip book 50 in the upper left corner of form 10.

11. In Block 3 of record 2, which is the receiving template record, the user pastes the data still on the clipboard from record 1.

Normal Usage

1. Double click a 1348-1A shortcut on the desktop screen for the personal computer being used to run the program.
2. The user clicks a cyan-colored "New Record for Disposal" button 22 to create a new disposal form.
3. The user uses the Tab key to complete data entry, using context-sensitive help as needed.
4. Print the form.
5. For additional items/disposal documents, the user returns to Step 2.
6. If the user is receiving equipment, the user clicks the lavender "New Record for Receiving" button 24.

To better describe the operation of the property management system of the present invention, the utility as it pertains to the DD 1348-1A form and its use at the Naval Air Warfare Center Weapons Division at Point Mugu, Calif. is detailed. The following description is not intended to limit the possible utilities of the present invention. The DD 1348-1A form 10 contains numbered columns 1–3, 4–6, 7, 23–24, 25–29, 45, 46–50, 51, 52–53, 54–56, 57–59, 60–61, 62–64, 65–66, 67–69, 70, 71, 72, 73, and 74–80. Those columns correspond to various information. However, several of the columns are not used, when filling out the form 10 as it relates to the disposal and receiving applications for equipment and other property. The columns for form 10 are as follows:

| Column(s) | Column Title | Definition |
| --- | --- | --- |
| 1–3 | Doc Ident | Unused in Disposal and Receiving applications. |
| 4–6 | RI From | Unused in Disposal and Receiving applications. |
| 7 | M & S | Unused in Disposal and receiving applications. |
| 23–24 | Unit Iss | Unit of Issue. A pull-down list provides the choices, such as EA for each, PG for package, FT for foot, etc. The program uses a default value of "EA". The user can access the list by clicking below "Unit Iss" on the default value. |
| 25–29 | Quantity | Quantity. The number of items being transferred to or received from the Defense Reutilization and Marketing Office (DRMO), i.e. being disposed of by the issuing organization. The program uses a default value of "1". |
| 45 | Ser | Unused in Disposal and Receiving applications. |
| 46–50 | Supplementary Address | Address of the recipient, specified in the form of the Unit Identification Code (UIC), a 6-character code issued at the Federal level to identify organizational units. For the Disposal application the program uses a default value of "SZ3189", which is the UIC of DRMO, Port Hueneme. For the Receiving application, the user's UIC code is used. |

-continued

| Column(s) | Column Title | Definition |
| --- | --- | --- |
| 51 | Sig | Unused in Disposal and Receiving applications. |
| 52–53 | Fund | Unused in Disposal and Receiving applications. |
| 54–56 | Distribution | Unused in Disposal and Receiving applications. |
| 57–59 | Project | Unused in Disposal and Receiving applications. |
| 60–61 | Pri | Unused in Disposal and Receiving applications. |
| 62–64 | Reqd Del Date | Required Delivery Date. Usurped in the Disposal application for indicating the Disposal Code in column 64. The program has a pull-down list and a button for user access that provides an explanation for each code. The program uses a default value of "N". |
| 65–66 | ADV | Advice Code. Usurped in the Disposal and Receiving applications for indicating the Demilitarization Code in column 65. The program has a pull-down list and a button for user access that provides an explanation for each code. The program uses a default value of "A". |
| 67–69 | RI | Unused in Disposal and Receiving applications. |
| 70 | O/P | Unused in Disposal and Receiving applications. |
| 71 | Cond | Condition Code. The program has a pull-down list and a button for user access that provides an explanation for each code. |
| 72 | MGT | Unused in Disposal and Receiving applications. |
| 73 | blank | Unused in Disposal and Receiving applications. |
| 74–80 | Unit Price | The unit price of the item(s) being disposed of. Entry is in dollars and cents. The program does not insert a default value. |

The Unit of Issue contained in columns 23–24 of the 1348-1A disposal form 10 is an abbreviation of the types of units under which material is issued. A sample list of Unit of Issue abbreviations are as follows, for example FT is Foot; PT is Pint; AT is Assortment; FV is Five; PZ is Packet; AY is Assembly; and QT is Quart.

To better describe the operation of the property management system of the present invention, the utility as it pertains to the needs of the Naval Air Warfare Center Weapons Division at Point Mugu, Calif. will be detailed. The following description is not intended to limit the possible utilities of the present invention. In a preferred embodiment of the present invention, Disposal Authority Codes are inserted in Column 64. Disposal Authority Codes indicate items being transferred to a Defense Reutilization and Marketing Office (DRMO) are authorized to be transferred to disposal because of instructions of the IMM/ICP (Integrated Material Manager/Item Control Point) relayed through the Material Returns Program (MRP) or other proper authority. As illustrated in FIG. 1, the user may access a list of Disposal Authority codes by clicking a green "Disposal Codes (for Col 64)" button 38. The applicable codes provided to the user on a computer monitor are listed and defined as follows:

| Code | Explanation |
|---|---|
| F | Federal Civil Agency turn-ins (includes turn-ins from GSA). |
| M | Items on this transaction are IMM/ICP (Integrated Material Manager/Item Control Point) stocks and are being transferred to disposal by authority of the responsible inventory manager. |
| N | Items on this transaction are not reportable by virtue of an exclusion to the Material Returns Program (MRP) of MILSTRIP or other specific criteria such as extended dollar value or condition limitations on excess reporting and are duly authorized to be transferred to disposal. |
| R | Items on this transaction have been reported to the IMM/ICP in accordance with MILSTRIP MRP procedures and have been directed to disposal by the inventory manager. Excess transaction status codes SF, SL, SN, TC, TD, or TX were provided by the IMM/ICP on DI Code FTR. |

The following define certain abbreviations used throughout the present invention. These abbreviations and their associated definitions appear below the Disposal Codes on the computer monitor when the user clicks on the "Disposal Codes (for Col 64)" button 38.

| | |
|---|---|
| AEDA | Ammunitions, Explosives, and Dangerous Articles. |
| CWC | Compressed Work Center. |
| DRMO | Defense Reutilization and Marketing Office. |
| FSC | Federal Supply Class. |
| GSA | Government Services Administration. |
| MILSTRIP | Military Standard Requisitioning and Issue Procedures. |
| MLI | Munitions List Item. |
| NSN | National Stock Number. |
| SLI | Strategic List Item. |
| UIC | Unit Identification Code. |

In a preferred embodiment of the present invention, Demilitarization Codes are inserted in Column 65 As illustrated in FIG. 1, the user may access a list of Demilitarization Codes by clicking the green "Demilitarization Codes (for Col 65)" button 42. The applicable codes provided to the user on the computer monitor are listed and defined as follows:

A Non-MLI/Non-SLI—Demilitarization not required. {MLI=Munitions List Item, SLI=Strategic List Item}

B MLI (Non-SME)—Demilitarization not required. Trade Security Controls (TSCs) required at disposition.

C MLI (SME)—Remove and/or demilitarize installed key point(s), as prescribed in DOD 4160.21-M-1, or lethal parts, components and accessories.

Navy Case No. 84095

D MLI (SME)—Total destruction of item and components so as to preclude restoration or repair to a usable condition by melting, cutting, tearing, scratching, crushing, breaking, punching, neutralizing, etc. (As an alternate, burial or deep water dumping may be used when coordinated with the DOD Demilitarization Program Office at HQ Defense Logistics Agency.)

E MLI (Non-SME)—Additional critical items/Material determined to require demilitarization, either key point or total destruction. Demilitarization instructions to be furnished by the DOD Demilitarization Program Office identified in Code "D" above.

F MLI (SME)—Demilitarization instructions to be furnished by the Item/Technical Manager.

G MLI (SME)—Demilitarization required-AEDA. Demilitarization, and if required, declassification and/or removal of sensitive markings or information, will be accomplished prior to physical transfer to a DRMO. This code will be used for all AEDA items, including those which also require declassification and/or removal of sensitive markings or information. {AEDA=Ammunitions, Explosives, and Dangerous Articles}

P MLI (SME)—Security Classified Item—Declassification and any additional demilitarization and removal of any sensitive markings or information will be accomplished prior to accountability or physical transfer to a DRMO. This code will not be assigned to AEDA items.

Q SLI—Strategic List Item—Demilitarization not required. SLI are non-MLI and are controlled by the U.S. Department of Commerce through the Export Administration Regulations (EAR) and indicated on the Commerce Control List (CCL). Each CCL entry is preceded by a four-digit Export Control Classification Number (ECCN) and those ECCNs ending in the letter "A" or "B" are defined as Strategic List Items. These items are subject to Import Certification and Delivery Verification (IC/DV) control and other Trade Security Controls.

In a preferred embodiment of the present invention, Condition Codes are inserted in Column 71. The Condition Code indicates the condition of the equipment being disposed. As illustrated in FIG. 1, the user may access a list of Condition Codes by clicking a green "Condition Codes (for Col 71)" button 44. The applicable codes provided to the user on the computer monitor are listed and defined as follows:

A Serviceable (Issuable Without Qualification). New, used, repaired, or reconditioned material which is serviceable and Issuable to all customers without limitation or restriction. Includes material with more than 6 months shelf life remaining.

B Serviceable (Issuable With Qualification). New, used, or reconditioned material which is serviceable and Issuable for its intended purpose, but which, is restricted from issue to specific units, activities, or geographical area by reason of its limited usefulness or short service life expectancy. Includes material with 3–6 months shelf life remaining.

C Serviceable (Priority Issue). Items which are serviceable and Issuable to selected customers, but which must be issued before Condition A and B material to avoid loss as a usable asset. Includes material with less than 3 months shelf life remaining.

D Serviceable (Test/Modification). Serviceable material which requires test, altercation, modification, conversion, or disassembly. This does not include items which must be inspected or tested immediately prior to issue.

E Unserviceable (Limited Restoration). Material which involves only limited expense or effort to restore to serviceable condition and which is accomplished in the storage activity where stock is located.

F Unserviceable (Reparable). Economically reparable material which requires repair, overhaul, or reconditioning; includes reparable items which are radioactivity contaminated.

G Unserviceable (Incomplete). Material requiring additional parts or components to complete the end item prior to issue.

H Unserviceable (Condemned). Material which has been determined to be unserviceable and does not meet repair criteria.

S Unserviceable (Scrap). Material that has no value except for its basic material content. No stock will be recorded as on hand in Condition Code S. This code is used only on transactions involving shipments to DRMOs. Material will not be transferred to Code S prior to turn-in to DRMOs if material is recorded in Code A through H at the time material is determined excess. Material identified by NSN may not be identified by this Condition Code.

As indicated above, to better describe the operation of the property management system of the present invention, the utility as it pertains to the Naval Air Warfare Center Weapons Division (NAWCWPNS) at Point Mugu, Calif. and the DRMO at Port Hueneme, Calif. will be detailed. The following description is not intended to limit the possible utilities of the present invention. The property management system program enables the user to access help features that assist the user in completing the form. In a preferred embodiment of the present invention, one help feature is accessed by clicking "Hints for Filling Out the Form" button 46, as illustrated in FIG. 2. The following assistance or helpful hints for the user are revealed which appears on the computer's monitor.

Hints on Selected Fields

Columns 25–29, Quantity: 5 digits. Use leading zeros (0s).

Columns 45–50, Supplementary Address: UIC of DRMO Port Hueneme=SZ3189

Columns 74–80, Unit Price: Original unit cost or closest estimate of value at purchase.

Block 2, Ship From: put your UIC in parens on line 1; put your full address starting on line 2.

Block 3, Ship To: DRMO Pt. Hueneme lists 779 Stethem Road as its address. That's its mailing address, physical location is Bldg 526. Go in the Pleasant Valley Road gate. At the Stop sign go straight. Take the next left into the warehouse building.
(SZ3189)
DRMO Pt. Hueneme
779 Stethem Road, Bldg. 526
Port Hueneme, Calif. 93043-4314

Block 5, Doc Date: Julian Date, YJJJ→>1-digit calendar year, 3-digit day-of-year (with leading zeros as needed)

Block 24, Document Number & Suffix: Sample—N63126 9001 209P—MAX of 15 characters for barcode.
DRMO, Hueneme, wants the 14 characters in columns 30–43 on DD Form 13487-6 but NOT column 44, the Demand Code. Suffix probably refers to column 44. The Document Number breaks down to the 6-character UIC/Requisitioner, 4-digit (Julian) Date, and 2-digit Serial number concatenated with the NAWCWPNS 2-character Compressed Work Center (CWC). (Some Commands do not have a CWC or its equivalent and use all four (4) final positions as a serial number.) NOTE. If you are very, very careful, you may improve readability by putting a single dash (or space) between the UIC and the JDay, and a single dash (or space) between the JDay and the Serial number. This 16-char. string is allowed because the software eliminates dashes or spaces in those specific spots when it creates the barcode. If you are not the careful type, do not use dashes or spaces between the subitems; just type all 14 characters in one continuous string.

Block 25, National Stock No. & Add: MAX of 15 characters for NSN barcode. If there is no NSN, a Local Stock Number is entered. A typical LSN is the 4-digit Commodity Code (space)+ 00 (space) Item name/type. Sample LSN—7021 00 COMPUTER—Local Stock Numbers are not barcoded.

+AKA the Federal Supply Class (FSC)

NOTE. For the NSN, if you are very, very careful, you may improve readability by putting a single dash (or space) in the usual spots: positions 5, 8, and 12. This 16-char. string is allowed because the software eliminates dashes or spaces in those specific spots when it creates the barcode. If you are not the careful type, do not use dashes or spaces in positions 5, 8, and 12 of the National Stock Number; just type all 13 NSN digits in one continuous string.

The "Hints on Selected Fields" screen also has a "Lists: FSCs & CWCS" button 48. When the user clicks on button 48, the on the user's computer screen.

Selected Commodity Codes

Common 4-digit Commodity Codes, AKA Federal Supply Classes(FSCs)

| FSC | Description |
| --- | --- |
| 2310 | Passenger Motor Vehicles |
| 2320 | Trucks and Truck Tractors, Wheeled |
| 2330 | Trailers, Mobile Homes |
| 2340 | Motorcycles, Motor Scooters, & Bicycles |
| 2540 | Vehicle Furniture & Accessories |
| 2590 | Misc Vehicle Components |
| 3610 | Print, Duplicating, & Bookbinding Equip. |
| 4110 | Refrigeration Equip., Refrigerators |
| 4140 | Fans, Air Circulators and Blower Equip. |
| 5110 | Hand Tools, Edged, Nonpowered |
| 5130 | Hand Tools, Power Driven |
| 5805 | Telephone & Telegraph Equip. |
| 5815 | Teletype and Facsimile Equipment |
| 5836 | Video Recording & Reproducing Equip. |
| 6130 | Power Supplies |
| 6135 | Batteries, Nonrechargeable |
| 6140 | Batteries, Rechargeable |
| 6625 | Power Meter, Signal Generator, Multi-Meter, Oscilloscope |
| 6730 | Photo Projection Equipment |
| 7005 | Disk Drive |
| 7010 | ADPE Systems Configuration; CPU |
| 7020 | Computer, Analog |
| 7021 | Computer, Digital |
| 7022 | Computer, Hybrid |
| 7025 | ADP Input/Output and Storage Devices, e.g. Printers, Monitors, Tape Drives, Terminals |
| 7030 | ADP Software |
| 7032 | Multiplexer |
| 7033 | (External) Modem |
| 7035 | ADP Supplies and Equipment |
| 7050 | ADP Components |
| 7110 | Office Furniture, Safes |
| 7125 | Cabinets, Lockers, Bins, Shelving |
| 7195 | Miscellaneous Furniture and Fixtures |
| 7290 | Misc Household Commercial Furnish. & Appliances |
| 7430 | Typewriters |
| 7490 | Misc Office Mach |
| 7510 | Office Supplies |

This screen also provides the user with Selected NAWCWPNS Compressed Work Centers which are 2-character codes. For example, the Compressed Work Center 1Q is defined as Code 522 400E and the individual identified for as the head of that code is Smith (last name).

A "List: Commodity Codes & CWCs" button 52 appears on the screen. When the user clicks on this button, the Selected Commodity Codes will appear on the screen, the same as when the user clicks on the "Lists: FSCs & CWCs" button 48. The screen also includes the "Return" button.

The following appears when the user clicks on the "Enter UIC & CWC" button 20.

UIC & CWC Entry

The UIC and CWC you select will be used on all new records. The 6-character UIC, 4-digit (Julian) Date, and 2-digit Serial number concatenated with the 2-character CWC form the Document Number (Block 24). NAWCW-PNS places the CWC after the Serial #. Alternatively, some units place the CWC (or its equivalent) before the 2-digit Serial #. If you use all 4 positions for a Serial # and the 1st 2 are always the same, say 00, enter 00 as your CWC and select 'Before Serial #' for the position of the CWC. If you don't use a CWC (or its equivalent), enter two question marks (??)—to remind yourself to enter the 2 digits of the 4-digit Serial #.

Select/Type your UIC button 30
Type your 2-char. CWC button 32
Select position of 2-char. CWC button 34
Some Known UICs
N0429A NAS(Pt. Mugu)
N09459 VAW113
N09830 VX-9
N31625 FMP MOCC EPAC
N32904 NATEC
N41342 BUPERS
N60530 NAWCWPNS, China Lake
N61756 PMTC and/or PMR or ??
N61762 White Sanda
N62583 NavFac, SLC Dive Locker
N63126 NAWCWPNS, Pt. Mugu
N68936 NAWS, C.L.
N69232 Port Hueneme
CWC=Compressed Work Center
    a 2-character code created by the NAWCWPNS Comptroller FSC=Federal Supply Class
    a 4-digit code created at the Federal level UIC=Unit Identification Code
    a 6-character code created at the Federal level When the user clicks "Receiving Equipment" button 54, the following appears on the users monitor.

Instructions for Receiving Equipment

The DD 1348-1A is used both to turn equipment in to DRMO and to receive equipment from DRMO. (Generally, equipment that someone else turned in.)

To receive equipment from DRMO, go to their warehouse to check that what you want is in their inventory and available, i.e. that no one else has already claimed it. DRMO personnel will help you. If it is available, use Form 103 to "freeze" it, that is, to reserve it in your name. An easy way to handle the paperwork for receiving equipment is to reserve RECORD # 2 in this file as a "Receiving Template", much the way Record 1 is a "Disposal Template". The receiving template record will be different than the "turn in/disposal" template record. The minimum changes in the receiving template record, RECORD # 2, and in the process will be listed here, but please check with your local DRMO for complete details. For the Port Hueneme DRMO, call John Doe at XXX-XXXX.

RECORD 2 (Receiving Template):
    cols 45–50: your UIC (not DRMO's)
    Block 2: DRMO's address info (not yours)
    Block 3: your address info (not DRMO's)

Data record:
    The data record is filled in after you click the lavender "New Record for Receiving" button. When you do the Form 103 at DRMO's facility, DRMO will provide/tell you:
    Cols 23–24: Unit of Issue
    Col 65: Demilitarization Code
    Col 71: Condition Code
    Cols 74–80: Unit Price
    Block 17: Nomenclature
    Block 25: NSN or LSN
    Block 27: Manufacturer, Model #, Serial #, and barcode on the item—if any
    Location of the equipment for the space below blocks 22–23 and to the right of blocks 26–27
    Note:
        Col 64: Blank. The Disposal Authority Code is blank because you are not disposing of anything.
        Block 26: Blank. Typically, "Additional Remarks" are not needed.

After "freezing" the equipment via Form 103 when you check if it's available at DRMO, in this electronic DD 1348-1A click the lavender "New Record for Receiving" button. Then proceed to fill in the data record as follows:
    the DRMO provided "Data records" info listed above,
    Cols 25–29: the quantity you will be picking up,
    Block 24: complete the sequence # for the Document Number.

In a preferred embodiment of the present invention, the user accesses another help feature by clicking on the green "TroubleShooting" button 56, as illustrated in FIG. 2. "TroubleShooting" reveals the following on the user's computer screen.

Troubleshooting

Print Problems

1. When I print, the template record (Record 1), and only the template record, prints instead of the record I'm in. How do I get the record I'm in to print?

Ans: In the Print dialog box two entries are of interest: the "Print:" box at the top and the "Print Range" about half way down. You apparently have "Records being browsed" selected in the "Print:" box. This entry needs to be "Current record". You also have "Pages from: 1 to: 1" selected. While this entry is not in error, "All" should work for the DD 1348-1A form. However selecting "Pages from: 1 to: 1" is a good way to prevent accidentally reprinting lots and lots of records if you have erroneously selected "Records being browsed".

2. When I print, all the records in the database print, not just the record I'm on.

Ans: In the Print dialog box, look at the "Print:" box at the top. You apparently have "Records being browsed" selected. This entry needs to be "Current record".

3. On my printer the heavy line at the bottom of the 2nd form is printed on a new page. All the information prints on the 1st page, so I don't need the 2nd page at all. How do I eliminate it?

Ans: In the Print dialog box, look at the "Print range" about half way down. Instead of "All" select "Pages" and then enter 1 in the "from" box and 1 in the "to" box. Now only the 1st page will print.

When the user is finished the "TroubleShooting" feature, the user may return to the form 10 by clicking the "Return" button 36.

If a user has access to FedLog, the user may obtain the National Stock Number (NSN), colloquially known as a federal stock number. The NSN has the form AAAA-BB-CCC-DDDD. This number is entered in Block 25 of the DD 1348-1A. If the item to be disposed of has no NSN, the user is to make up a stock number, referred as a Local Stock Number (LSN). There are three (3) parts to a LSN: the 4-digit Federal Supply Class (FSC), "00", and the Nomenclature of the item. The Federal Supply Class (FSC) is also known as the Commodity Code. For example, the LSN for a digital computer is 7021-00-COMPUTER and the LSN for a printer is 7025-00-PRINTER.

Referring first to FIGS. 1 and 6A and 6B, the DD 1348-1A form 10 contains numbered blocks 1 through 27. Those blocks correspond to various information. Similar to the columns, several of the blocks are unused when filling out the form 10 as it relates to the disposal of equipment. The necessary blocks are as follows:

| Block | Block Title | Definition |
|---|---|---|
| 1 | Total Price | Total Price. The program multiples the Quantity (in columns 25–29) by the Unit Price (in columns 74–80) to arrive at the Total Price. |
| 2 | Ship From | The full address, starting with the UIC in parentheses, of the releasing/disposing organization. For disposal this data is entered one-time in record 1 and is subsequently duplicated by the program in succeeding records when the user clicks the cyan "New Record for disposal" button. The program defaults the UIC portion to "N63126", the UIC of NAWCWPNS, Pt. Mugu. The Receiving template, record 2, is initialized to DRMO Port Hueneme's UIC and address. This data is duplicated by the program in succeeding records when the user clicks the lavender "New Record for Receiving" button. |
| 3 | Ship To | The full address, starting with the UIC in parentheses, of the receiving organization. For disposal, this data is entered one-time in record 1 and is subsequently duplicated by the program in succeeding records when the user clicks the cyan "New Record for Disposal" button. The program defaults this entry to UIC "SZ3189" and the rest of the address of DRMO, Port Hueneme. The Receiving template, record 2, is initialized to "N63126", the UIC of NAWCWPNS, Pt. Mugu. The User enters his/her address in record 2. This data is duplicated by the program in succeeding records when the user clicks the lavender "New Record for Receiving" button. |
| 4 | Mark For | May be the receiving organization or a person within that organization. For Disposal the program defaults this entry to "DRMO Port Hueneme". There is no default entry for the Receiving application. |
| 5 | Doc Date | The Julianized Date of the item(s) that are being disposed of or received. The program automatically enters this 4-digit number when a new record is created. The entry is based on the date in the host computer. |
| 6 | NMFC | Not used in either the Disposal or Receiving application. |
| 7 | FRT Rate | Not used in either the Disposal or Receiving application. |
| 8 | Type Cargo | Not used in either the Disposal or Receiving application. |
| 9 | PS | Not used in either the Disposal or Receiving application. |
| 10 | Qty Rec'd | Not used in either the Disposal or Receiving application. |
| 11 | UP | Not used in either the Disposal or Receiving application. |
| 12 | Unit Weight | Not used in either the Disposal or Receiving application. |
| 13 | Unit Cube | Not used in either the Disposal or Receiving application. |
| 14 | UFC | Not used in either the Disposal or Receiving application. |
| 15 | SL | Not used in either the Disposal or Receiving application. |
| 16 | Freight Classification Nomenclature | Not used in either the Disposal or Receiving application. |
| 17 | Item Nomenclature | Name of the item(s) being disposed of or received. Brief (about 30 characters or less), high-level description of the item(s). |
| 18 | TY CONT | Not used in either the Disposal or Receiving application. |
| 19 | NO CONT | Not used in either the Disposal or Receiving application. |
| 20 | Total Weight | Not used in either the Disposal or Receiving application. |
| 21 | Total Cube | Not used in either the Disposal or Receiving application. |
| 22 | Received By | For disposal the receiving official at DRMO enters his/her name. For receiving equipment from DRMO, the user enters his/her name. |
| 23 | Date Received | The receiving official at DRMO enters the date. |
| 24 | Document Number & Suffix (30–44) | Document Number in the form: 6-character UIC-4-digit Julian Date-nnnn, where nnnn is a sequence number for that date. |
| 25 | National Stock & ADD (8–22) | The National Stock Number (NSN), if any or in its absence, a made up Local Stock Number (LSN). The NSN is the 13-digit number issued to national/federal stock items. The format is: nnnn-nn-nnn-nnnn. There are three (3) parts to a LSN: the 4-digit Federal Supply Class (FSC), "00", and the Nomenclature of the item. |
| 26 | RIC (4–6) | Not Used in the Disposal or Receiving application. |
| | UI (23–24) | Not Used in the Disposal or Receiving application. |
| | QTY (25–29) | Not Used in the Disposal or Receiving application. |
| | CON CODE (71) | Not Used in the Disposal or Receiving application. |
| | DIST (55–56) | Not Used in the Disposal or Receiving application. |
| | UP (74–80) | Not Used in the Disposal or Receiving application. |
| | REMARKS | In the Disposal application, Block 26 has been usurped for additional remarks such as certifying that a computer's hard disk has been |

-continued

| Block | Block Title | Definition |
|---|---|---|
| | | degaussed. Typically not used in the Receiving application. |
| 27 | Additional Data | Block 27 is used for the equipment's Manufacturer, Model No., Serial No., and BarCode tag (if any). |

Referring to FIGS. 6A and 6B, for the disposal application, the user enters the data required in block 24 which is the document number; block 25 which is the National or Local Stock number; block 26 which is reserved for additional remarks; and block 27 which is reserved for additional manufacturing data. For the receiving application the user enters the data required in block 24 which is the document number. DRMO provides the National or Local stock number for block 25 and the additional manufacturing data for block 27.

At this time, it should be noted that an FSCs button 85 appears on the screen. When a user clicks on the FSCs button 85, the "Selected Commodity Codes" appears on the computer screen.

The following is a Table in which, most, but not all, of the fields correspond to column and block headers on the DD 1348-1A Form. When they do correspond, the field name is generally the same as the header on the form. Depending upon the application, some entries are quite different than that suggested by the header. The Description of Field column in the table uses bold text to identify the true data being entered. Some descriptions indicate a red question mark or red text will be displayed on the computer screen. These are indicators to the user that an entry should be made.

DD 1348-1A Program Documentation Pertinent
Field Definitions and Scripts

Pertinent Field Definitions

| Field Name | Field Type | Description of Field/Formula/Entry Options |
|---|---|---|
| Unit ISS w Description | Text | User selects Unit of Issue from a pop-up list of all possible 2-character entries, with the name of the entry in parentheses, e.g., EA (Each). The list starts with the 6 most likely choices, followed by a complete alphabetized list. In the Disposal and Receiving template records, the field is set to EA, which acts as the de facto default. |
| Unit ISS Overlay | Text (from a Calculation) | If the Unit ISS w Description field is blank, displays a red question mark in that space. Otherwise, displays nothing. |
| Quantity | Number | User enters Quantity of item being disposed of (or received). Program only allows values of type Number in the range 1 to 99999. In the Disposal and Receiving template records, the field is set to 1, which acts as the de facto default. |
| Quantity Overlay | Text (from a Calculation) | If the Quantity field is blank, displays a red question mark in that space. Otherwise, displays nothing. |
| Supplementary Address (Col 46–50) | Text | This field has been usurped for the user to enter the Unit Identification Code (UIC) of the group receiving the items. In the Disposal template record, the UIC for DRMO, Port Hueneme, has been entered as the de facto default. If a different DRMO is being used, the user may change the value in the Disposal template. The Receiving template utilizes the User's UIC. |
| Req'd Del Date | Text | This field has been usurped for the user to select the Disposal Code from a pop-up list of all possible entries. In the Disposal template record the field is set to N, which acts as the de facto Disposal default. This field is blank in the Receiving template. |
| Req'd Del Date Overlay | Text (from a Calculation) | If the Req'd Del Date field is blank, displays a red question mark in that space. Otherwise, displays nothing. |
| ADV | Text | This field has been usurped for the user to select the Demilitarization Code from a pop-up list of all possible entries. In the Disposal and Receiving template records the field is set to A, which acts as the de facto default. |
| ADV Overlay | Text (from a Calculation) | If the ADV field is blank, displays a red question mark in that space. Otherwise, displays nothing. |
| Cond | Text | User selects the Condition Code from a pop-up list of all possible entries. Since no one choice predominates, there is no default value and no entry in either the Disposal or Receiving template record to act as a de facto default. |
| Cond Overlay | Text (from a Calculation) | If the Cond field is blank, displays a red question mark in that space. Otherwise, displays nothing. |
| Unit Dollars | Number | User enters the whole dollars portion of the original value of the item. Program only allows values of type Number. |

-continued

| Field Name | Field Type | Description of Field/Formula/Entry Options |
|---|---|---|
| Unit Dollars Overlay | Text (from a Calculation) | If the Unit Dollars field is blank, displays a red question mark in that space. Otherwise, displays nothing. |
| Unit Cents | Number | User enters the cents portion of the original value of the item. Program only allows values of type Number in the range 0 to 99. |
| Unit Cents Overlay | Text (from a Calculation) | If the Unit Cents field is blank, displays a red question mark in that space. Otherwise, displays nothing. |
| Unit Price | Number (from a Calculation) | Program computes Unit Price as: (Unit Dollars + Unit Cents/100). Result is rounded to 2 decimal places. |
| Total Price | Number (from a Calculation) | Program computes Total Price as: (Unit Price * Quantity). Result is rounded to 2 decimal places. |
| Total Cents | Number (from a Calculation) | Program computes Total Price Cts as: the result of the modulus function of (Total Price *100,100) rounded to 0 decimal places. |
| Total Dollars | Number (from a Calculation) | Program computes Total Price Dollars as: the result of (Total Price − Total Cents/100) rounded to 0 decimal places. |
| Ship From | Text | For Disposal, the user enters his/her address in the Ship From field (Block 2) starting with the UIC in parentheses, followed by the normal address. Typically, this address is entered in the Disposal template record to act as the de facto Disposal default. The Receiving template is initialized to DRMO Port Hueneme's UIC and address. |
| Ship From Overlay | Text (from a Calculation) | In Disposal records, if the Ship From field is blank or contains the UIC only, "displays your full address" in red in that space. Otherwise, displays nothing. Always blank in Receiving records. |
| Ship To (Blk 3) | Text | User enters DRMO's address in the Ship To field starting with DRMO's UIC in parentheses, followed by the normal address. The UIC and address of the Port Hueneme DRMO have been entered in the Disposal template record to act as the de facto Disposal default. For Receiving, the user enters his/her address, starting with the UIC in parentheses, followed by the normal address. Typically, this address is entered in the Receiving template record to act as the de facto Receiving default |
| Mark For (Blk 4) | Text | User enters the organization or person to receive the item(s) in the Mark For field. "DRMO Port Hueneme" has been entered in the Disposal template record to act as the de facto Disposal default. Left blank in the Receiving template record. |
| JDay | Text (from a Calculation) | The program uses the date in the computer to calculate the Julian Date as: the last digit of the year concatenated with the 3-digit day of year. |
| Doc Date | Text | The "New Record for Disposal" and "New Record for Receiving" scripts set the Doc Date field (Block 5) to the value: JDay. If the user prefers a different JDay, he/she may enter it in lieu of the calculated value. |
| Doc Date Overlay | Text (from a Calculation) | If the Doc Date field is blank, displays "JDay" in red in that space. Otherwise, displays nothing. |
| Item Nomenclature (Blk 17) | Text | The user enters a brief, high-level description, the Item Nomenclature, for the item. |
| Item Nomenclature Overlay | Text (from a Calculation) | In Disposal records, if the Item Nomenclature (Blk 17) field is blank, displays "Item Nomenclature here" in red in that space. Otherwise, displays nothing. In Receiving records, when the Item Nomenclature (Blk 17) field is blank, the (red) text reads "DRMO to provide Nomenclature". Otherwise, displays nothing. |
| Document Number | Text | In Block 24, user enters the unique Document Number composed of 3 components: the user's 6-character UIC, the 4-digit JDay, and a 4-digit serial number on that JDay. The UIC defaults to the value the user entered at: 1$^{st}$ usage of the program. The JDay is automatically computed from the date in the computer. Thus, the user needs only enter the 4-digit serial number. The program uses a validation formula to give the user feedback on the entry of illegal characters. |
| Document Number Overlay | Text (from a Calculation) | If the serial number portion of the Document Number field is blank, displays data entry guidance in red below the Document Number field. Otherwise, displays nothing. |

-continued

| Field Name | Field Type | Description of Field/Formula/Entry Options |
| --- | --- | --- |
| Document Number BarCode | Text (from a Calculation) | Program automatically converts the human readable Document Number into the 3 of 9 barcode. |
| National Stock Number | Text | User enters the 13-character National Stock Number in Block 25 on the form. If the item has no National Stock Number, the user creates and enters a Local Stock Number consisting of the Federal Supply Class (FSC), the digits 00, and the Nomenclature of the item. The program uses a validation formula to give the user feedback on the entry of illegal characters. |
| National Stock Number Overlay | Text (from a Calculation) | If the National Stock Number field is blank, displays data entry guidance in red in that space. Otherwise, displays nothing. |
| National Stock Number BarCode | Text (from a Calculation) | If the entry in the National Stock Number field contains exactly 13 characters, the program automatically converts it into the 3 of 9 barcode. Otherwise, it displays nothing. |
| RIC | Text | In the Disposal application, Block 26 has been usurped for additional remarks, such as certifying that a computer's hard disk has been degaussed. Typically not used in the Receiving application. |
| RIC Overlay | Text (from a Calculation) | For Disposal records, displays data entry guidance (in red) if the user has made no entry in the RIC field. Blank in Receiving records. |
| Additional Data | Text | Block 27 is used to list the equipment's Manufacturer, Model No., Serial No., and BarCode tag (if any). |
| Add 1 Data Overlay | Text (from a Calculation) | Displays data entry guidance (in red) if the user has made no entry in the Additional Data field. |
| Disposing Official w Addr | Text | In Disposal records, in the open area in the lower right of form, the user enters the Point of Contact's name, address, and phone #, and underlines a line for the POC's signature. Typically, this information is entered in the Disposal template record to act as the de facto Disposal default. In Receiving records, the user enters the equipment location that DRMO provides. |
| Disposer Overlay | Text (from a Calculation) | Displays data entry guidance (in red) if the user has made no entry in the Disposing Official w Addr field. |
| gt_Disposal Authority Codes | Text | Contains the text for the help screen that lists the Disposal Authority Codes. |
| gt_Demilitarization Codes | Text | Contains the text for the help screen that lists the Demilitarization Codes. |
| gt_Condition Codes | Text | Contains the text for the help screen that lists the Condition Codes. |
| UIC | Text | User may click an on-screen button (Enter UIC & CWC (& CWC Position) for new Records) that allows entry of the Unit Identification Code (UIC) into the Disposal and Receiving template records, in essence, setting that entry as the default value. The user is advised to make this entry the very first time he/she uses the program. |
| CWC | Text | User may click an on-screen button (Enter UIC & CWC (& CWC Position) for new Records) that allows entry of the Compressed Work Center (CWC) into the Disposal and Receiving template records, in essence, setting that entry as the default value. The user is advised to make this entry the very first time he/she uses the program. |
| gt_FSCs 1 | Text | Contains the text for the left column of the help screen that lists selected Federal Supply Classes (FSCs). FSCs are a component of the National Stock Number (NSN) and Local Stock Number (LSN). |
| gt_FSCs 2 | Text | Contains the text for the right column of the help screen that lists selected Federal Supply Classes (FSCs). FSCs are a component of the National Stock Number (NSN) and Local Stock Number (LSN). |
| gt_Form Hints | Text | Contains the text for the help screen that gives data entry help/hints for the various columns and block entries. |
| gt_TroubleShooting | Text | Contains the text for the "Troubleshooting" help screen. |
| gt_Ver Num & Date | Text | Contains the text with the Version Number and Date of the version of the DD 1348-1A form being used. |

Although the descriptions above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A computer-based system for managing property comprising:
   (a) means for entering information relating to quantity, monetary value, transfer date and other data with regard to said property, said information being entered into a first screen layout which corresponds to a printable form, wherein said first screen layout selectively depicts a first form for disposing of said property and a second form for receiving said property, said first form when selected by a user to appear on said first screen layout allowing said user to track said property through a property disposal process and said second form when selected by said user to appear on said first screen layout allowing said user to track said property through a property receiving process;
   (b) first program means for converting readable text to a first barcode, wherein said first barcode identifies said property by a document number;
   (c) second program means for converting said readable text to a second barcode, wherein said second barcode identifies said property by a federal stock number
   (d) means for overlaying explanatory text in a plurality of fields of the first screen layout, wherein said explanatory text consists of said information required in each of said plurality of fields; and
   (e) means for printing the first screen layout, wherein the first screen layout comprises said information regarding said property.

2. The computer-based system of claim 1 further comprising means for duplicating said first form on said first screen layout to produce a third form identical to said first form on said first screen layout, said third form being positioned below said first form on said first screen layout, said first screen layout including a cut line positioned between said first form and said third form, said cut line allowing said user to separate said first form from said third form when said user prints said first and third forms from said first screen layout.

3. The computer-based system of claim 1 further comprising means for duplicating said second form on said first screen layout to produce a fourth form identical to said second form on said first screen layout, said fourth form being positioned below said second form on said first screen layout, said first screen layout including a cut line positioned between said second form and said fourth form, said cut line allowing said user to separate said second form from said fourth form when said user prints said second and fourth forms from said first screen layout.

4. The computer-based system of claim 1 wherein said first program means is a 3 of 9 barcode font program.

5. The computer-based system of claim 4 wherein said second program means is a 3 of 9 barcode font program.

6. The computer-based system of claim 1 wherein said document number comprises:
   (a) a six character unit identification code, said unit identification code identifying a disposer of said property when said property is being processed through said property disposal process, said unit identification code identifying a receiver of said property when said property is being processed through said property receiving process;
   (b) a four digit julian date, said julian date indicating a date of disposal of said property when said property is being processed through said property disposal process, said julian date indicating a date for receiving said property when said property is being processed through said property receiving process; and
   (c) a two digit serial number for said property; and
   (d) a two digit work center, said work center being located at an installation for disposing of and receiving said property.

7. The computer-based system of claim 6 wherein said document number appears on a second screen layout which said user utilizes to enter said unit identification code, said julian date, said serial number and said work center through said second screen layout to create said document number.

8. The computer-based system of claim 1 further comprising means for accessing a Hints on Selected Fields feature, said Hints on Selected Fields feature assisting a user in entering the information required for said first screen layout, said Hints on Selected Fields feature appearing on a third screen layout.

9. The computer-based system of claim 1 further comrpising means for accessing a Trouble Shooting feature, said Trouble Shooting feature identifying a lists of problems encountered when using said computer-based system and providing solutions for said problems, said Trouble Shooting feature appearing on a fourth screen layout.

10. A computer-based system for managing property comprising:
   (a) means for entering information relating to quantity, monetary value, transfer date and other data with regard to said property, said information being entered into a first screen layout which corresponds to a printable form, wherein said first screen layout selectively depicts a first form for disposing of said property and a second form for receiving said property, said first form when selected by a user to appear on said first screen layout allowing said user to track said property through a property disposal process and said second form when selected by said user to appear on said first screen layout allowing said user to track said property through a property receiving process;
   (b) first program means for converting readable text to a first barcode, wherein said first barcode identifies said property by a document number;
   (c) second program means for converting said readable text to a second barcode, wherein said second barcode identifies said property by a federal stock number
   (d) means for overlaying explanatory text in a plurality of fields of the first screen layout, wherein said explanatory text consists of said information required in each of said plurality of fields;
   (e) first duplicating means for duplicating said first form on said first screen layout to produce a third form identical to said first form on said first screen layout, said third form being positioned below said first form on said first screen layout, said first screen layout including a first cut line positioned between said first form and said third form, said first cut line allowing said user to separate said first form from said third form when said user prints said first and third forms from said first screen layout;
   (f) second duplicating means for duplicating said second form on said first screen layout to produce a fourth form identical to said second form on said first screen layout, said fourth form being positioned below said second form on said first screen layout, said first screen layout including a second cut line positioned between said second form and said fourth form, said second cut line allowing said user to separate said second form from said fourth form when said user prints said second and fourth forms; and (e) means for printing the first screen layout, wherein the first screen layout comprises said information regarding said property.

11. The computer-based system of claim 10 wherein said first program means is a 3 of 9 barcode font program.

12. The computer-based system of claim 10 wherein said second program means is a 3 of 9 barcode font program.

13. The computer-based system of claim 10 wherein said document number comprises:

(a) a six character unit identification code, said unit identification code identifying a disposer of said property when said property is being processed through said property disposal process, said unit identification code identifying a receiver of said property when said property is being processed through said property receiving process;

(b) a four digit julian date, said julian date indicating a date of disposal of said property when said property is being processed through said property disposal process, said julian date indicating a date for receiving said property when said property is being processed through said property receiving process; and (c) a two digit serial number for said property; and (d) a two digit work center, said work center being located at an installation for disposing of and receiving said property.

14. The computer-based system of claim 13 wherein said document number appears on a second screen layout which said user utilizes to enter said unit identification code, said julian date, said serial number and said work center through said second screen layout to create said document number.

15. The computer-based system of claim 10 further comprising means for accessing a Hints on Selected Fields feature, said Hints on Selected Fields feature assisting a user in entering the information required for said first screen layout, said Hints on Selected Fields feature appearing on a third screen layout.

16. The computer-based system of claim 10 further comrpising means for accessing a Trouble Shooting feature, said Trouble Shooting feature identifying a lists of problems encountered when using said computer-based system and providing solutions for said problems, said Trouble Shooting feature appearing on a fourth screen layout.

17. A computer-based method for managing property comprising the steps of:

(a) selecting a property disposal form or a property receiving form which appear on a first screen layout, the property disposal form when selected by a user allowing said user of said computer-based system to track said property through a property disposal process and the property receiving form when selected by said user allowing said user to track said property through a property receiving process;

(b) entering information relating to quantity, monetary value, transfer date and other data with regard to said property, wherein said information is entered into said first screen layout which corresponds to a printable form;

(c) converting readable text to a first barcode, wherein said first barcode identifies said property by a document number;

(d) converting said readable text to a second barcode, wherein said second barcode identifies said property by a federal stock number;

(e) overlaying explanatory text in a plurality of fields of the first screen layout, wherein said explanatory text consists of said information required in each of said plurality of fields; and (f) printing the first screen layout, wherein the first screen layout comprises said information regarding said property when said property is being processed through said property disposal process or said property receiving process.

18. The computer-based method of claim 17 wherein said first program means is a 3 of 9 barcode font program.

19. The computer-based method of claim 17 wherein said second program means is a 3 of 9 barcode font program.

20. The computer-based method of claim 17 wherein said document number comprises:

(a) a six character unit identification code, said unit identification code identifying a disposer of said property when said property is being processed through said property disposal process, said unit identification code identifying a receiver of said property when said property is being processed through said property receiving process;

(b) a four digit julian date, said julian date indicating a date of disposal of said property when said property is being processed through said property disposal process, said julian date indicating a date for receiving said property when said property is being processed through said property receiving process; and (c) a two digit serial number for said property; and (d) a two digit work center, said work center being located at an installation for disposing of and receiving said property.

21. The computer-based method of claim 20 wherein said document number appears on a second screen layout which said user utilizes to enter said unit identification code, said julian date, said serial number and said work center through said second screen layout to create said document number.

22. The computer-based method of claim 17 further comprising the step of accessing a Hints on Selected Fields feature, said Hints on Selected Fields feature assisting a user in entering the information required for said first screen layout, said Hints on Selected Fields feature appearing on a third screen layout.

23. The computer-based method of claim 17 further comprising the step of accessing a Trouble Shooting feature, said Trouble Shooting feature identifying a lists of problems encountered when using said computer-based system and providing solutions for said problems, said Trouble Shooting feature appearing on a fourth screen layout.

* * * * *